United States Patent
Matsumoto

(10) Patent No.: US 10,564,700 B2
(45) Date of Patent: Feb. 18, 2020

(54) IMAGE FORMING APPARATUS AND POWER CONTROL METHOD FOR IMAGE FORMING APPARATUS

(71) Applicant: CANON KABUSHIKI KAISHA, Tokyo (JP)

(72) Inventor: Akihiro Matsumoto, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 15/648,153

(22) Filed: Jul. 12, 2017

(65) Prior Publication Data

US 2018/0024613 A1 Jan. 25, 2018

(30) Foreign Application Priority Data

Jul. 22, 2016 (JP) .................................. 2016-144508
Jun. 20, 2017 (JP) .................................. 2017-120748

(51) Int. Cl.
*G06F 1/3234* (2019.01)
*G06F 1/26* (2006.01)
(Continued)

(52) U.S. Cl.
CPC ............ *G06F 1/3284* (2013.01); *G06F 1/266* (2013.01); *G06F 1/3287* (2013.01); *G06F 13/4247* (2013.01); *G06F 2213/0032* (2013.01)

(58) Field of Classification Search
CPC ...... G06F 1/3268; G06F 1/266; G06F 1/3203; G06F 1/3275; G06F 1/3287; G06F 1/3221; G06F 1/3225; G06F 1/3253; G06F 1/3256; G06F 1/3281; G06F 1/3284; G06F 2213/0032; G06F 3/0601; G06F 3/0625; G06F 3/0688; G06F 3/1221; G06F 3/1229; G06F 3/1285; Y02D 10/154;
(Continued)

(56) References Cited

U.S. PATENT DOCUMENTS 6,802,014 B1 10/2004 Suurballe
2013/0083338 A1* 4/2013 Fahrenkrug ........... G06F 3/1221
358/1.13

(Continued)

FOREIGN PATENT DOCUMENTS

| CN | 102622077 A | 8/2012 |
|---|---|---|
| CN | 103443739 A | 12/2013 |
| JP | 2005-78514 A | 3/2005 |

*Primary Examiner* — Phil K Nguyen
*Assistant Examiner* — Brian J Corcoran
(74) *Attorney, Agent, or Firm* — Canon U.S.A., Inc. IP Division

(57) ABSTRACT

A control apparatus configured to control power of a device that communicates with a host system via a communication interface which complies with a predetermined standard includes a reception unit configured to receive a signal indicating that the host system transitions to a predetermined power state and a determination unit configured to determine, according to reception of the signal indicating that the host system transitions to the predetermined power state, a power state of each of the device and a physical layer of the communication interface used by the device from a plurality of power states, based on a power state of the host system, a power state of the device, and a power state of the physical layer of the communication interface included in the device and complying with the predetermined standard.

8 Claims, 14 Drawing Sheets

(51) Int. Cl.
*G06F 1/3287* (2019.01)
*G06F 13/42* (2006.01)

(58) Field of Classification Search
CPC ...... Y02D 50/20; Y02D 10/13; Y02D 10/159; Y02D 10/171
See application file for complete search history.

(56) References Cited

U.S. PATENT DOCUMENTS

| | | |
|---|---|---|
| 2014/0089693 A1 | 3/2014 | Ooi |
| 2015/0338909 A1* | 11/2015 | Woodruff .............. G06F 1/3209 713/323 |
| 2016/0004294 A1* | 1/2016 | Stenfort ................ G06F 1/3268 713/310 |
| 2016/0050335 A1 | 2/2016 | Matsumoto |

\* cited by examiner

FIG.4

| LOCATION AND SETTING / UPPER-LEVEL POWER STATE | Standby (402) | Sleep (403) | Deep (404) |
|---|---|---|---|
| SATA COMPONENT POWER SAVING STATE (406) | PowerSave0 (PS0) *407* | PowerSave1 (PS1) *408* | PowerSave2 (PS2) *409* |
| H-Host-IF (410) | DevSleep/ Slumber/Partial *411* | DevSleep/ Slumber *412* | DevSleep (→ POWER OFF) *413* |
| B-Host-IF (414) | Al/LPI/DevSleep/ Slumber/Partial/OffLine *415* | Slumber/DevSleep/ OffLine *416* | DevSleep/OffLine (→ POWER OFF) *417* |
| HDD/SSD MAIN BODY (418) | Al/LPI/DevSleep/ POWER OFF *419* | Al/LPI/DevSleep/ POWER OFF *420* | STATE CONTINUATION (→ POWER OFF) *421* |

| EXTENDED COMMAND NAME 501 | CMD NUMBER 502 | TRANSFER TYPE 503 | SPECIFIED CONTENT 504 |
|---|---|---|---|
| SetupPowerConfig  505 | 01h  506 | PO  507 | SET THE FOLLOWING STATES INDIVIDUALLY FOR EACH OF THE POWER SAVING MODES PS0, PS1, AND PS2<br>· POWER SAVING STATE OF H-Host-IF<br>· POWER SAVING STATE OF B-Host1-IF AND POWER SAVING STATE OF MAIN BODY OF DEVICE CONNECTED TO B-Host1-IF<br>· POWER SAVING STATE OF B-Host2-IF AND POWER SAVING STATE OF MAIN BODY OF DEVICE CONNECTED TO B-Host2-IF  508 |
| ToSleep  509 | 02h  510 | ND  511 | NOTIFY THE SATA BRIDGE CONTROL UNIT THAT THE UPPER-LEVEL POWER STATE TRANSITIONS TO THE "Sleep STATE"  512 |
| ToDeep  513 | 03h  514 | ND  515 | NOTIFY THE SATA BRIDGE CONTROL UNIT THAT THE UPPER-LEVEL POWER STATE TRANSITIONS TO THE "Deep STATE"  516 |
| GetStatus  517 | 04h  518 | PI  519 | ACQUIRE THE STATUS OF THE SATA BRIDGE CONTROL UNIT  520 |

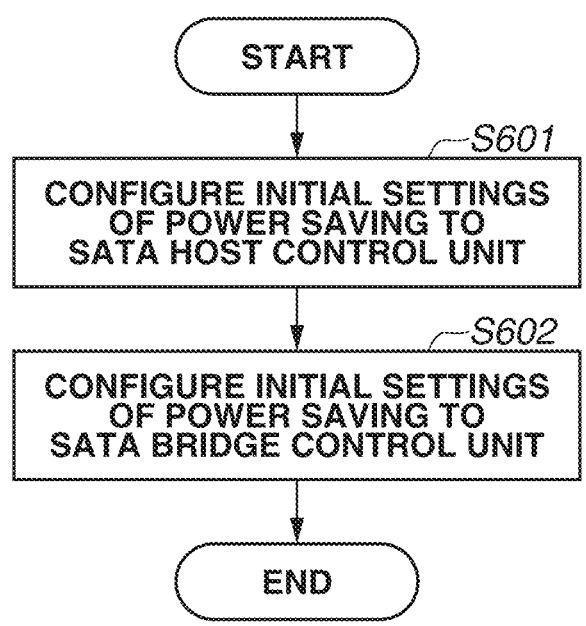

FIG.14

| IMAGE FORMING APPARATUS | MAIN CONTROLLER | ENGINE CONTROLLER | |
|---|---|---|---|
| OFF | OFF | OFF | POWER OFF LIVEWAKE SIGNAL LINE MAY BE SET TO ANY SETTING |
| STANDBY | ON | ON | POWER OFF SET LIVEWAKE SIGNAL LINE TO OFF |
| SLEEP | ON (POWER SAVING MODE) | ON (POWER SAVING MODE) | POWER OFF SET LIVEWAKE SIGNAL LINE TO ON |
| DEEPSLEEP | OFF (MAINTAIN POWER SUPPLY ONLY TO A PART OF HARDWARE) | OFF | POWER OFF POWER OFF |

1400
1402
1403
1404

IMAGE FORMING APPARATUS AND POWER CONTROL METHOD FOR IMAGE FORMING APPARATUS

BACKGROUND OF THE INVENTION

Field of the Invention

The present invention relates to a power control technique for an image forming apparatus.

Description of the Related Art

In recent years, regulations adopted by various countries have been becoming stricter year after year as measures against environmental issues such as global warming. For example, image forming apparatuses are also no exception, and are required to sincerely address the environmental issues and actively deal with various kinds of energy-related standards.

Further, mobile electronic apparatuses, such as notebook personal computers (PCs) and tablet PCs, are in widespread use. Then, there is Peripheral Component Interconnect (PCI) Express, which is a standard for interfaces of internal buses, for allowing the mobile electronic apparatuses to be kept driven by a battery for a further longer time period. Further, there is Serial Advanced Technology Attachment (SATA), which is a standard for interfaces (IFs) with storage devices.

Power saving states are formulated at a level of a standard. For example, power saving states on an IF between a host and a device are added in SATA. As the former, a Standby command, a Sleep command, and the like are defined. Further, as the latter, Partial, Slumber, and Device-Sleep (hereinafter referred to as DevSleep) are defined as the power saving states. Representative examples of the storage devices include a hard disk drive (hereinafter referred to as an HDD) and a solid state drive (SSD).

The above-described DevSleep state is the power saving state designed especially for the SSD, and enables reductions in both power of the SATA-IF and power of a main body at run-time.

Standby power is a relatively high in the SATA-IF and the storage device connected thereto in an idle state other than a time period when access is ongoing.

Especially, Redundant Arrays of Inexpensive Disk (RAID) control and/or data encryption processing may be performed as an SATA bridge configuration. In this case, high standby power is consumed in central processing unit (CPU) systems of an SATA main control unit that is a host side and an SATA bridge control unit that is a device side, a plurality of storage devices, and a plurality of SATA-IFs (for example, physical layers) connecting them. In this case, runtime power saving control is required.

For example, some HDDs include a Parallel ATA (PATA)-IF. There is an SATA bridge configuration that bridges such an HDD and the SATA host control unit including the SATA-IF. There is a technique for issuing the above-described power saving-related command to the SATA bridge control unit without bothering an upper-level main CPU in this configuration.

More specifically, there is proposed a method for causing the SATA-IF between the SATA host control unit and the SATA bridge control unit, which is the device side, to transition to the above-described Partial or Slumber power saving state according to a status of the power saving control on the HDD (Japanese Patent Application Laid-Open No. 2005-78514).

However, the method discussed in Japanese Patent Application Laid-Open No. 2005-78514 is processing for transitioning the SATA component to a power saving state based on the power saving-related command directed to the HDD. In other words, a power saving state transition condition is not linked with a power state of the entire apparatus, and the transition to the power saving state is determined only based on the SATA component portion alone. As such, there is a limit to finely adjusted power saving control.

SUMMARY OF THE INVENTION

According to an aspect of the present invention, a control apparatus configured to control power of a device that communicates with a host system via a communication interface which complies with a predetermined standard includes a reception unit configured to receive a signal indicating that the host system transitions to a predetermined power state and a determination unit configured to determine, according to reception of the signal indicating that the host system transitions to the predetermined power state, a power state of each of the device and a physical layer of the communication interface used by the device from a plurality of power states, based on a power state of the host system, a power state of the device, and a power state of the physical layer of the communication interface included in the device and complying with the predetermined standard.

Further features of the present invention will become apparent from the following description of exemplary embodiments with reference to the attached drawings.

BRIEF DESCRIPTION OF THE DRAWINGS

FIG. 4 illustrates SATA component power saving state types PS0 to PS2 and contents of settings.

FIG. 5 illustrates examples of extended commands relating to power saving control.

FIG. 6 illustrates an example of a flow of initialization of power saving settings of an SATA component.

FIG. 14 illustrates examples of power states of a printing apparatus.

DESCRIPTION OF THE EMBODIMENTS

Hereinafter, an exemplary embodiment of the present invention will be described with reference to the drawings.

Figure 1:
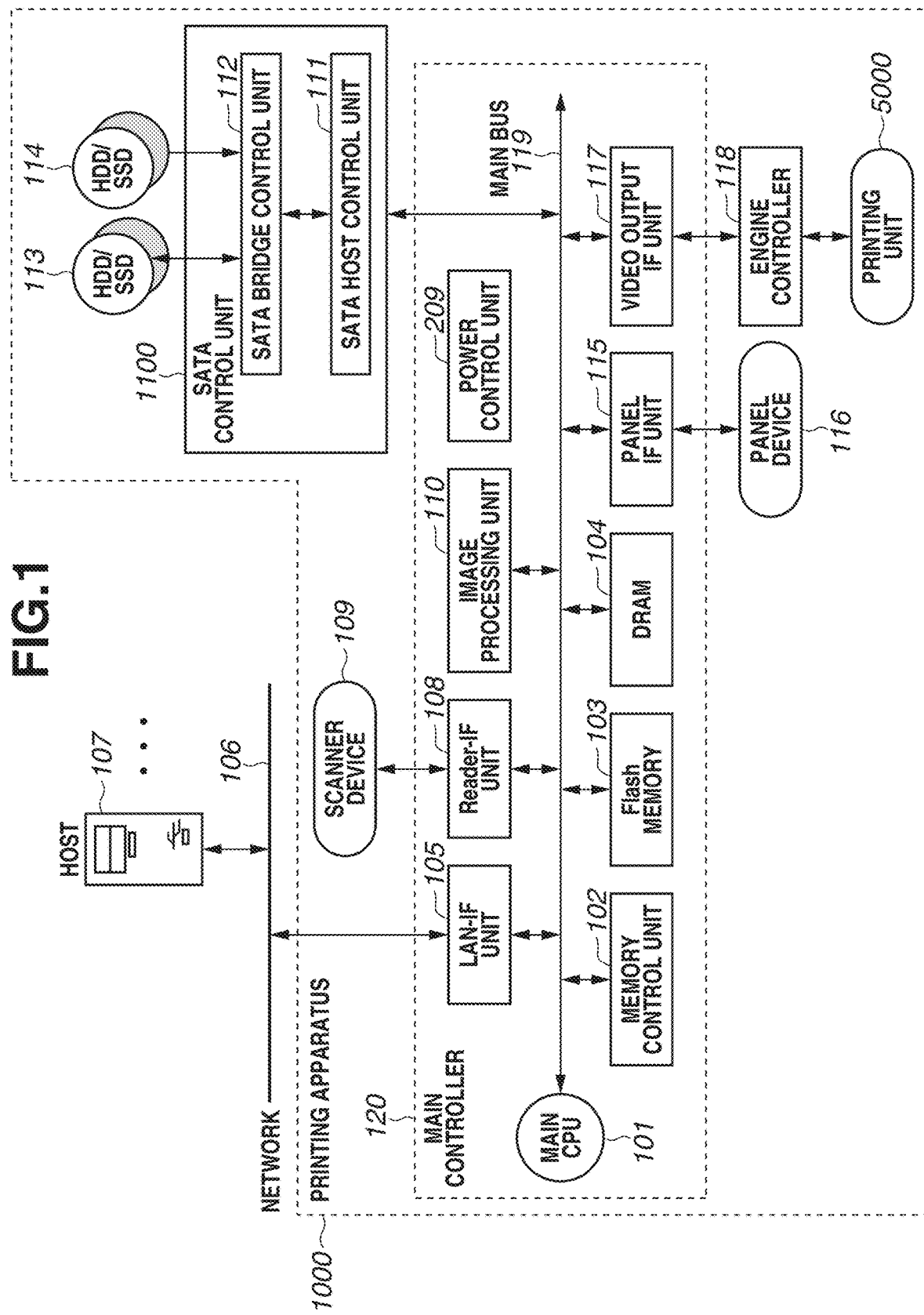
FIG. 1 illustrates an example of a system configuration of a main controller.

FIG. 1 illustrates an example of a system configuration of a main controller 120 in a printing apparatus. A main CPU (a central processing unit) 101 performs system control and various kinds of calculation processing. A memory control unit 102 controls an input and an output from and to various types of memory devices and controls direct memory access (DMA). A flash memory 103 is a rewritable nonvolatile memory, and stores therein, for example, a control program and a control parameter of the entire system. A dynamic random access memory (DRAM) 104 is a volatile rewrite-only memory represented by a Double-Data-Rate (DDR) memory. The DRAM 104 is used as a work area of a program, an area to store print data, an area to store various kinds of table information, and the like. In the present example, the relationship between the above-described memory control unit 102 and the various types of memory devices is expressed in a simplified manner, and, generally, these memory devices are controlled independently of one another. A local area network (LAN)-IF unit 105 controls an input and an output from and to a local area network 106 connected to the printing apparatus. Generally, the LAN-IF unit 105 supports the Transmission Control Protocol/Internet Protocol (TCP/IP) protocol. The LAN-IF unit 105 is connected to an apparatus usable in the network, such as an external HOST computer 107 via a network cable, and allows the printing apparatus to print the print data via the network. A Reader-IF control unit 108 controls communication with a scanner device 109. The Reader-IF control unit 108 realizes a copy function by causing input image data scanned by the above-described scanner device 109 to be printed. An image processing unit 110 performs various kinds of image processing on image data introduced via the above-described LAN-IF unit 105 or Reader-IF control unit 108. An SATA host control unit 111 controls an input and an output of data from and to a device including an IF in compliance with the SATA standard. An SATA bridge control unit 112 is connected to the above-described SATA host control unit 111 as a device as an upstream side thereof, and includes a plurality of Host-IFs and is connected to HDDs or SSDs 113 and 114 as a downstream side thereof. The above-described SATA bridge control unit 112 is equipped with a function as an added value, such as the RAID control and the data encryption. The present exemplary embodiment will be described assuming that the above-described SATA host control unit 111 and SATA bridge control unit 112 are mounted on the main controller 120 as individually independent application specific integrated circuits (ASICs). A panel IF control unit 115 controls communication with a panel device 116. A user can confirm various kinds of settings and states of the printing apparatus by operating a liquid crystal screen display, a button, and/or the like on the panel as a user interface (UI), although this is not illustrated in FIG. 1. A video output IF unit 117 controls communication of a command/status with a printing unit 5000 and transfers the print data to the printing unit 5000. The printing unit 5000 includes a main body of the printing apparatus, a sheet feeding system, and a sheet discharge system although this is not illustrated in FIG. 1, and prints the print data on paper mainly according to command information from the above-described video output IF unit 117. A main bus 119 includes a bus controller, and collectively expresses a control bus, a data bus, and a local bus between arbitrary blocks for convenience. The main bus 119 also includes PCI Express (PCIe), an internal bus of an ASIC, and the like as representative examples thereof.

An OFF state of the printing apparatus 1000 illustrated in FIG. 1 refers to a state in which the main controller 120 and a printer engine controller 118 are powered off as indicated in an OFF state 1400 illustrated in FIG. 14. FIG. 14 illustrates only one example, and the present exemplary embodiment is not limited thereto. Those skilled in the art will appreciate that the present exemplary embodiment can be realized even with the drawing of FIG. 14 removed from the present disclosure. When a power switch provided around the panel device 116 is pressed by a user's operation and an instruction is transmitted from the panel device 116 to a power control unit with the printing apparatus 1000 illustrated in FIG. 1 in the OFF state 1400, the printing apparatus 1000 transitions to a STANDBY state 1402. Further, when a request to carry out a job is received via the panel device 116 or the network 106 in a SLEEP state 1403 or a DEEP state 1404, the printing apparatus 1000 also transitions to the STANDBY state 1402. The DEEP state 1404 is an abbreviation for a DEEPSLEEP state 1404.

In the STANDBY state 1402, the printing apparatus 1000 illustrated in FIG. 1 is in a state capable of receiving both the instruction to carry out the job and an inquiry about information of the printing unit 5000 and/or the printer engine controller 118. Therefore, both the main controller 120 and the printer engine controller 118 have to have performed a required predetermined initialization operation so as to become ready to receive the job anytime. Hereinafter, the printer engine controller 118 will also be simply referred to as the engine controller 118. When the printing apparatus 1000 transitions from the OFF state 1401 or the DEEP state 1404 to the STANDBY state 1402, the main controller 120 powers on the printer engine controller 118.

At this time, the main controller 120 requests activation accompanied by an initialization operation such as calibration to the printer engine controller 118. Therefore, the main controller 120 transmits an instruction with use of a physical specific signal line between the main controller 120 and the printer engine controller 118. Hereinafter, the physical signal line for determining activation control information in this manner will be referred to as a LIVEWAKE signal line L. In other words, the LIVEWAKE signal line L is a signal line turned on or off when the activation control information is reflected.

The main controller 120 may power on the printer engine controller 118 after setting the LIVEWAKE signal line L to OFF in advance. This operation allows the main controller 120 to request the activation accompanied by the initialization operation such as the calibration to the printer engine controller 118.

When being powered on, the printer engine controller 118 first confirms a state of the LIVEWAKE signal line L, and performs the activation processing accompanied by the initialization operation such as the calibration if the LIVEWAKE signal line L is set to OFF.

If the panel device 116 is not operated for a predetermined time period in the STANDBY state 1402, the printing apparatus 1000 transitions to the SLEEP state 1403. When the inquiry about the information of the printing unit 5000 and/or the printer engine controller 118 is made via the network 106 in the DEEP state 1404, the printing apparatus 1000 transitions to the SLEEP state 1403.

The SLEEP state 1403 refers to a state in which the printing apparatus 1000 cannot receives the instruction to carry out the job and can receive only the inquiry about information of the printer engine. Basically, the printing apparatus 1000 turns off the image processing unit 110, the printer engine controller 118, the printing unit 5000, the scanner device 109, the Reader IF unit 108, the flash memory 103, the main CPU 101, a backlight of the panel device 116, and the like. Further, for both the main controller 120 and the printer engine controller 118, required processing is also limited in the SLEEP state 1403 compared to in the STANDBY state 1402. Therefore, the main controller 120 and the printer engine controller 118 are in operation with lower power than in the STANDBY state 1402. However, the printing apparatus 1000 maintains power supply to the LAN-IF unit 105, the DRAM 104, and a portion of the panel device 116 that detects an input from the user. The printer engine controller 118 is a controller that performs control on the printing unit 5000. The printing unit 5000 is a mechanism that outputs toner or the like onto a sheet. The engine controller 118 generates image data and the like to be printed, and frame data, and transmits them to the printing unit 5000.

When the printing apparatus 1000 transitions from the DEEP state 1404 to the SLEEP state 1403, the main controller 120 powers on the printer engine controller 118.

In this case, the main controller 120 requests activation unaccompanied by the initialization operation such as the calibration to the printer engine controller 118. Therefore, the main controller 120 powers on the printer engine controller 118 after setting the LIVEWAKE signal line L to ON in advance. When being powered on, the printer engine controller 118 first confirms the state of the LIVEWAKE signal line L, and performs the activation processing unaccompanied by the initialization operation such as the calibration if the LIVEWAKE signal line L is set to the ON state.

The LIVEWAKE signal line L is used in this manner. This use allows the main controller 120 to cause the printer engine controller 118 to perform the initialization processing required when the printing apparatus 1000 is in the STANDBY state 1402 and the initialization processing required when the printing apparatus 1000 is in the SLEEP state 1403 while distinguishing them from each other. Then, when an input is detected by the LAN-IF unit 105 or the predetermined input portion on the panel device 116, the power control unit 209 is notified thereof from the LAN-IF unit 105 or the panel device 116 with use of a not-illustrated signal line. The power control unit 209 supplies power to the main CPU 101 and supplies power to a required IF unit as necessary.

If the printing apparatus 1000 is not operated at all for a predetermined time period in the STANDBY state 1402 or the SLEEP state 1403, the printing apparatus 1000 transitions to the DEEPSLEEP state 1404. The DEEPSLEEP state 1404 is a state in which the power of the printing apparatus 1000 itself is reduced as much as possible. Let alone main portions of the main controller 120, the main CPU 101 also maintains power supply only to the portion capable of detecting the job (the user input portion of the panel device 116 and a predetermined control circuit of the LAN-IF unit 105), thereby allowing the power of the entire apparatus 1000 to enter an extremely low power state. The printing apparatus 1000 brought into the DEEP state 1404 can recover to the SLEEP state 1403 according to occurrence of an event detected by the LAN-IF unit 105 or an input from a predetermined user via the panel device 116.

More specifically, the main CPU 101 stores the state of the printing apparatus 1000 into the flash memory 103, and stops power supply to the main controller 120 and the printer engine controller 118, thereby reducing the power as much as possible. At this time, the main CPU 101 itself also stops operating, but power at the time of the sleep is turned on by means of hardware, so that the main CPU 101 enters a power saving state capable of detecting only arrival of the job or the inquiry with use of the predetermined circuit.

In this manner, the power state of the printing apparatus 1000 transitions based on the user's use state and a device setting (a time period taken until the transition to the SLEEP state 1403 or the DEEP state 1404). The power states of the main controller 120 and the printer engine controller 118 also change according thereto. In this manner, power saving states of the printing apparatus 1000, which is an upper level (i.e. a host) from the viewpoint of the SATA host control unit 111, are defined to be SLEEP 1403, DEEP (DEEPSLEEP) 1404, STANDBY 1402, and the like.

Figure 2:
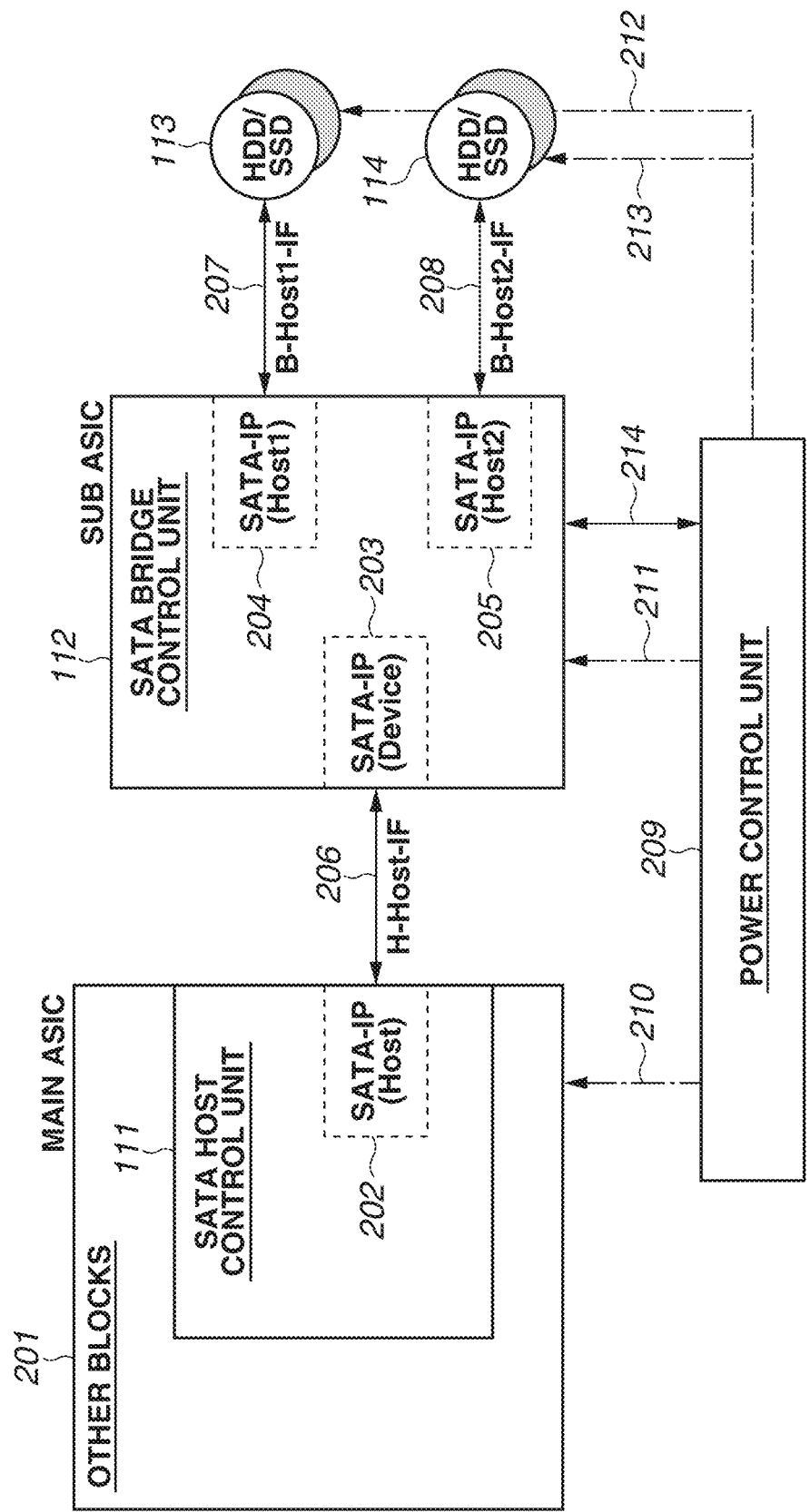
FIG. 2 illustrates an example of a connection of a Serial Advanced Technology Attachment (SATA) bridge configuration.

FIG. 2 illustrates an example of a connection as an SATA bridge configuration. A main ASIC 201 is a key ASIC controlling the entire system of the above-described main controller 120 that includes the above-described SATA host control unit 111. The above-described SATA host control unit 111 includes one SATA-Intellectual Property (IP) 202 as a host IF. A sub ASIC is the above-described SATA bridge control unit 112 itself, and is mounted as an independent integrated circuit (IC) on the main controller 120. The above-described SATA bridge control unit 112 includes three SATA-IPs 203 to 205. The SATA-IP (Host) 202 is connected to the SATA-IP (Device) 203 via an H-Host-IF 206 on an upstream side in the bridge configuration. The SATA-IP (Host1) 204 is connected to the HDD/SSD 113 via a B-Host1-IF 207 and the SATA-IP (Host2) 205 is connected to the HDD/SSD 114 via a B-Host2-IF 208 on a downstream side in the bridge configuration. Then, the above-described SATA-IPs 202 to 205 each include an SATA link layer and a physical layer. Further, the SATA-IPs 202 to 205 each issue a physical (as an electric signal) command (including a command regarding the power saving) in compliance with the SATA standard and receives a status to and from an SATA device connected via any of the SATA-IFs 206 to 208 according to settings in various kinds of SATA registers.

Further, the above-described SATA bridge control unit 112 is connected to the power control unit 209 via a control signal 214. The above-described power control unit 209 is mounted on a main board, and determines whether to supply power to each of the functional modules included in the above-described main controller 120 and the various kinds of devices connected thereto and is in charge of power control as the entire printing apparatus system. Chain lines 210 and 213 extending from the above-described power control unit 209 each indicate a power line toward each of the components of the SATA bridge unit, which is a part of the entire system.

The present exemplary embodiment will be described assuming that there are one IF between the SATA host control unit 111 and the SATA bridge control unit 112, and two IFs between the SATA bridge control unit 112 and the HDD/SSDs 113 and 114 bi-directionally connected thereto. The present exemplary embodiment may employ a connection configuration including any number of IFs as each of the IFs.

Figure 12:
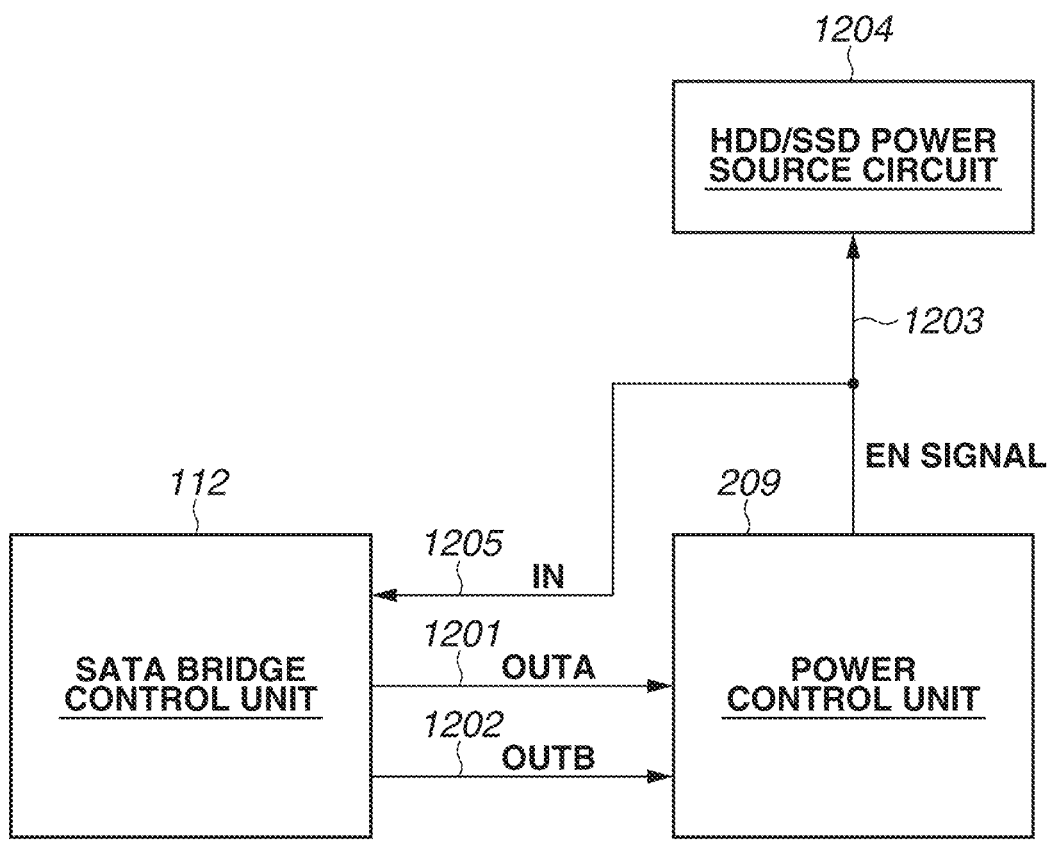
FIG. 12 illustrates an example of a connection between the SATA bridge control unit and a power control unit.

FIG. 12 illustrates a broken-down and further detailed configuration of the above-described control signal 214 that controls the power of the HDD/SSD between the above-described SATA bridge control unit 112 and the power control unit 209, the connection configuration of which has been described with reference to FIG. 2. A control signal IN 1205 is a signal input to the above-described SATA bridge control unit 112, and OUTA 1201 and OUTB 1202 are signals output to the above-described power control unit 209. Further, an EN signal 1203 for permitting power supply to a power source circuit 1204 that supplies power to the HDD/SSD is output from the above-described power control unit 209. Examples of the above-described power source circuit 1204 include a direct current-direct current (DC-DC) power source (a direct current input direct current output power source) and a field-effect transistor (FET), although this is not illustrated in FIG. 12. The above-described EN signal 1203 is connected to IN 1205, and is input to the SATA bridge control unit 112 as a monitor signal for determining a state of the power supply to the HDD/SSD, i.e., whether the HDD/SSD is powered on or off. The above-described signals OUTA 1201 and OUTB 1202 are request signals directed to the power control unit 209 for powering off/on the HDD/SSD.

Figure 13:
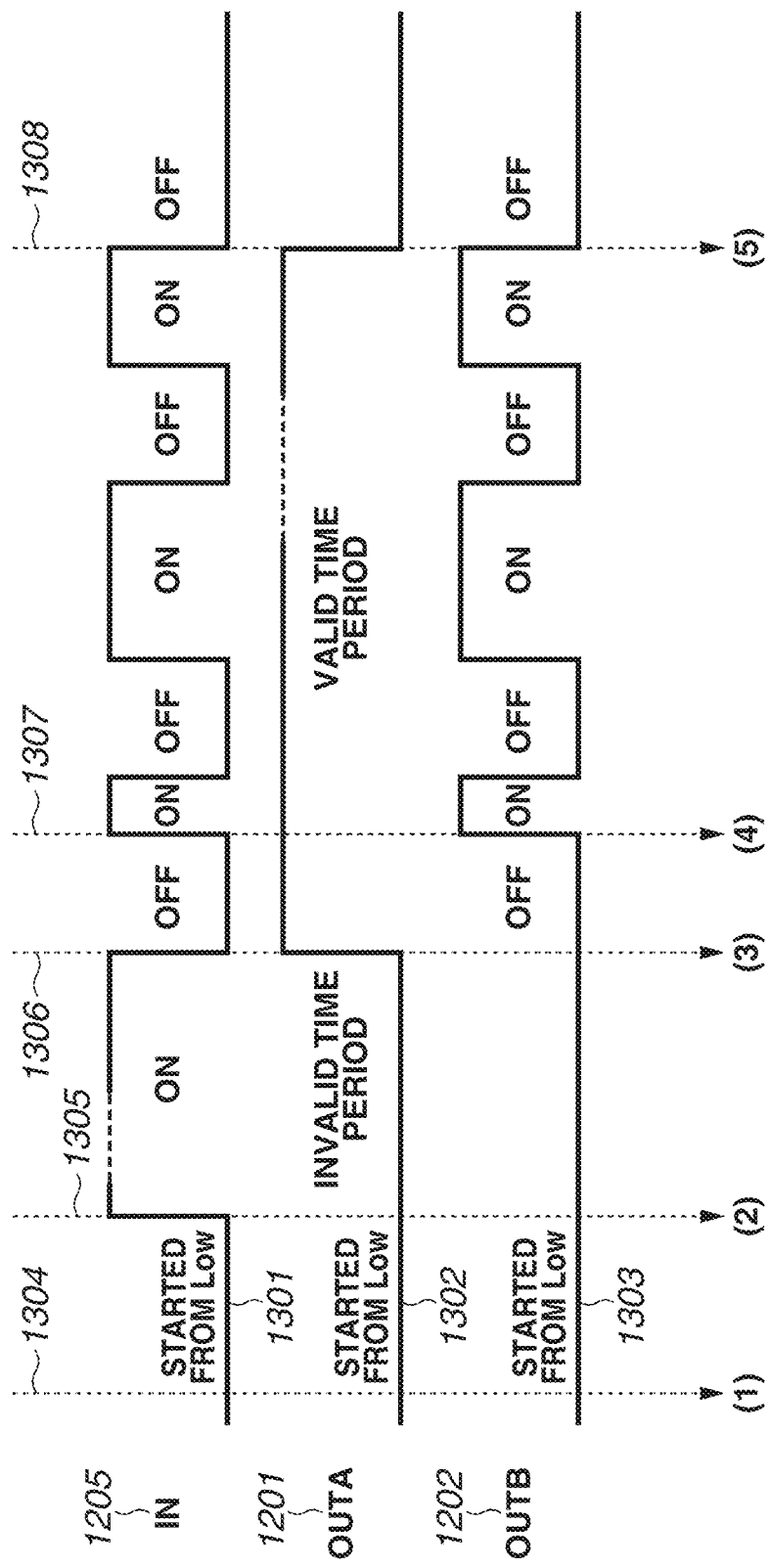
FIG. 13 illustrates an example of a power control timing for a hard disk drive (HDD).

FIG. 13 illustrates an example of a timing chart of the above-described control signal IN 1205, OUTA 1201, and OUTB 1202. All of the signals are assumed to be processed while being started from a Low level at a start point (1) 1304. The above-described control signal IN 1205 is the monitor signal indicating whether the HDD/SSD is in the powered-off/on state, and indicates that the HDD is powered on at a time (2) 1305 after being activated. OUTA 1201 is a signal indicating a valid time period when a request to power off or on the HDD/SSD is issued to the above-described power control unit 209. A period where this signal is Hi, i.e., a period from a time (3) 1306 to a time (5) 1308 is a time period when the request to power off or on the HDD/SSD is issued to the power control unit 209. OUTB 1202 is a signal for issuing the request to power on or off the HDD/SSD. A Hi period indicates an ON request, and a Low period indicates an OFF request. In the example illustrated in FIG. 13, at the start time (3) 1306, the signals OUTA 1201 and OUTB 1202 are set to OUTA=Hi and OUTB=Low, and therefore the HDD is powered off and this period is a period lasting until a time (4) 1307 where the signal OUTB 1202 is set to OUTB=Hi. In the period from the time (3) 1306 to the time (4) 1307, the control signal IN 1205, which is the monitor signal, is set to IN=Low, so that it can be confirmed that the HDD/SSD is actually powered off. Similarly, it can be confirmed that IN 1205 is changed to Hi/Low according to a result of changing OUTB 1202 to Hi/Low during the valid time period where OUTA 1201 is set to OUTA=Hi. In the example described with reference to FIGS. 12 and 13, IN 1205, which is the monitor signal, and OUTB 1202, which is the power-off/on request signal, are in a one-to-one relationship. However, the printing apparatus 1000 may be configured to prepare a monitor signal (=a power EN signal: INn and a power-off/on request signal: OUTBn (n≥2) for each of a plurality of storage devices connected to the SATA bridge control unit 112, and control the plurality of storage devices individually while associating the monitor signal and the power-off/on request signal having the same number n with each other.

Figure 3:
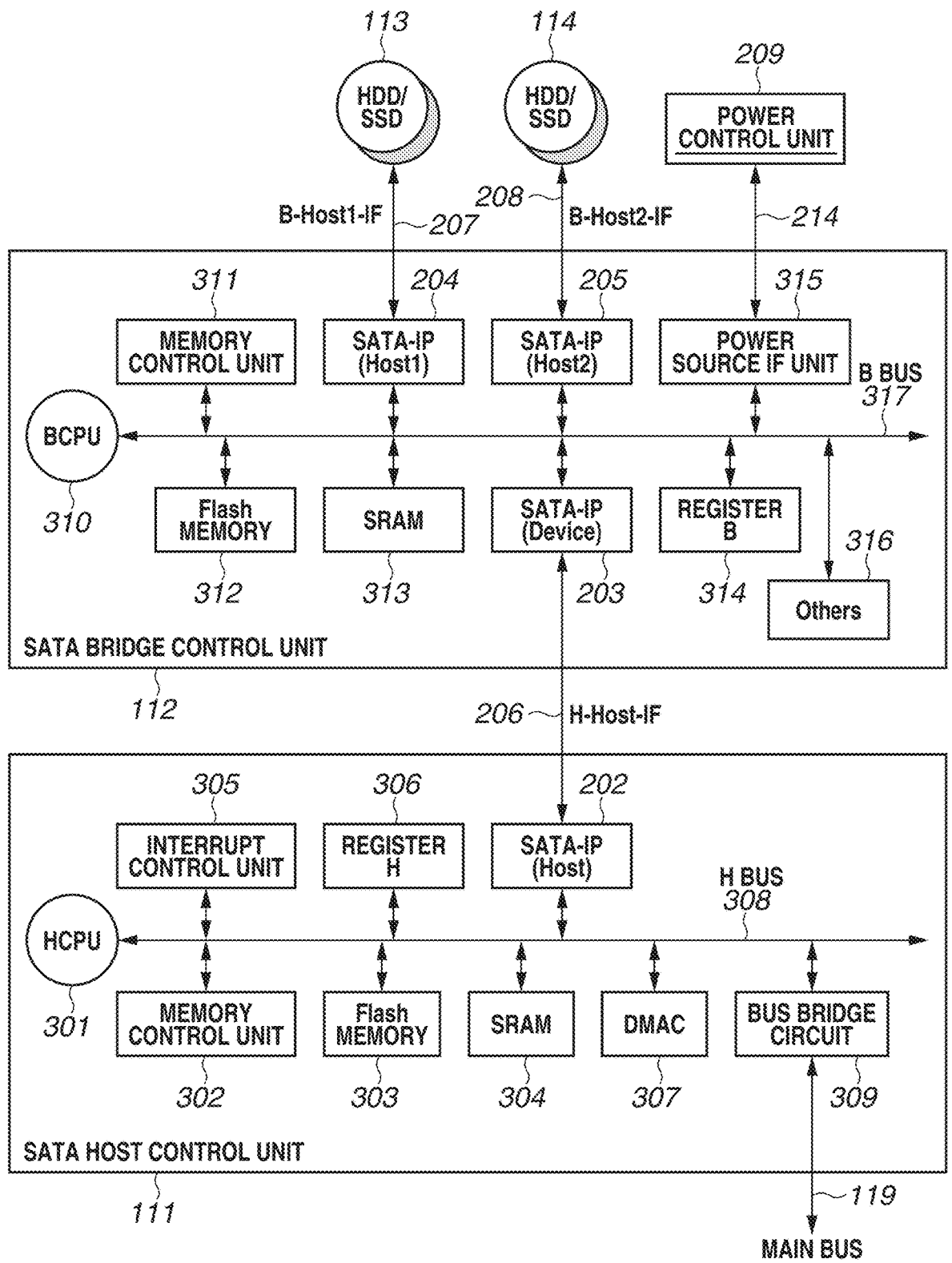
FIG. 3 illustrates examples of internal configurations of an SATA host control unit and an SATA bridge control unit.

FIG. 3 illustrates examples of internal configurations of the SATA host control unit 111 and the SATA bridge control unit 112. An HCPU 301 performs overall control as an SATA controller, such as processing for issuing an SATA command, processing for transferring transmission/reception data, and processing for receiving a status. A memory control unit 302 controls an input and an output from and to a flash memory 303 and a static random access memory (SRAM) 304. The flash memory 303 stores therein a boot program and a control program as the SATA controller. The SRAM 304 is used as a work area of the above-described HCPU 301, an area to store various kinds of control tables and a parameter, a data buffer, and the like. In the present example, the SRAM 304 is described to indicate control of a single-port RAM, a dual-port RAM, a First-In First-Out (FIFO) memory, or the like in a simplified manner, and there may be SRAMs controlled independently of each other and provided at a plurality of locations. An interrupt control unit 305 performs processing for inputting and outputting an interrupt signal from and to the above-described HCPU 301, mask processing on the above-described interrupt signal, and the like. A register H 306 is a register for temporarily storing, for example, a control parameter relating to the power saving. A direct memory access controller (DMAC) 307 transfers data between predetermined memories upon activation while head addresses and sizes of a transfer source and a transfer destination are set in a predetermined register by the above-described HCPU 301, although this is not illustrated in FIG. 3. An H bus 308 includes a bus controller, and collectively expresses a control bus, a data bus and a local bus between arbitrary blocks for convenience. A bus bridge circuit 309 is a bus bridge circuit that reciprocally converts a bus protocol between the above-described main bus 119 and the H bus 308.

A BCPU 310 performs overall control as an SATA controller, such as processing for issuing an SATA command, processing for transferring transmission/reception data, and processing for receiving a status. A memory control unit 311 controls an input and an output from and to a flash memory 312 and an SRAM 313. The flash memory 312 stores therein a boot program and a control program as the SATA controller. The SRAM 313 is used as a work area of the above-described BCPU 310, an area to store various kinds of control tables and a parameter, a data buffer, and the like. In the present example, the SRAM 313 is described to indicate control of a single-port RAM, a dual-port RAM, a FIFO memory, or the like in a simplified manner, and there may be SRAMs controlled independently of each other and provided at a plurality of locations. A register B 314 is a register for temporarily storing, for example, a control parameter relating to the power saving. A power source IF unit 315 is connected to the above-described power control unit 209 via the control signal 214, and controls the power-off/on request signal directed to the HDD/SSD 113 or 114. Others 316 collectively indicate other functional blocks as the SATA bridge control unit 112, such as the above-described RAID processing and data encryption processing. A B bus 317 includes a bus controller, and collectively expresses a control bus, a data bus, and a local bus between arbitrary blocks for convenience. Further, as described with reference to FIG. 2, the SATA-IP (Host) 202 of the SATA host control unit 111 and the SATA-IP (Device) 203 of the SATA bridge control unit 112 are connected to each other via the H-Host-IF 206. Further, the SATA-IPs (Host1/2) 204 and 205 are connected to the HDD/SSDs 113 and 114 via the B-Host1/2-IFs 207 and 208, respectively.

FIG. 4 illustrates SATA component power saving state types PS0 to PS2 and contents of settings. FIG. 4 indicates power states that are one example of information regarding the power states in the above-described main controller 120 on a horizontal axis, and power saving state transition conditions as one example of information regarding power saving states of an SATA component on a vertical axis. The printing apparatus 1000 may be configured in such a manner that required information among them is stored in a memory. The first row in FIG. 4 indicates an upper-level power state 401 as the entire printing apparatus 1000, and the upper-level power state 401 is defined to be a Standby mode 402, a Sleep mode 403, and a Deep mode 404 in an order of how high power consumption is. The above-described Standby mode 402 is a state in which the printing apparatus 1000 is ready to receive the job immediately. The above-described Sleep mode 403 and Deep mode 404 are the power saving states of the printing apparatus 1000, and are intended to reduce standby power while no job is carried out. Especially, the Deep mode 404 is a state in which power supply to most of the printing apparatus 1000 is stopped, and is defined assuming that all of the SATA components are in the powered-off state in this state. In the present exemplary embodiment, the "SATA component" basically means an IP core, an interface, and a device in compliance with the SATA standard. In other words, for example, the "SATA component" refers to each of the interfaces and the IP cores labeled 202 to 208 in the drawings. Further, the "SATA component" includes the HDD/SSD (HDD/SSDs 113 and 114), which is one example of a device compatible with SATA. An SATA control unit 1100 includes the above-described circuits, but may include a single circuit in some cases and may include a plurality of circuits in other cases. In the present exemplary embodiment, each of the modules illustrated in FIGS. 1, 2, 3, and 12 is implemented by a hardware circuit that performs the above-described processing or processing that will be described below. The hardware circuit can be implemented in various methods. Two or more circuits disclosed in the present exemplary embodiment may be collectively implemented with one circuit. Further, it is also possible that one circuit disclosed in the present exemplary embodiment is realized by a plurality of circuits.

Further, PowerSave0 (PS0) 407, PowerSave1 (PS1) 408, and PowerSave2 (PS2) 409 are defined as the power saving states of the SATA component that correspond to the above-described upper-level power state 401. This arrangement allows the printing apparatus 1000 to realize finely adjusted power saving states of the SATA component according to the upper-level power state 401.

The above-described states PS0 (407) to PS2 (409) correspond to the upper-level power state 401 as illustrated in FIG. 4, and are in a relationship of PS0<PS1<PS2 (a power-off) as power reduction effects thereof. Further, as a trade-off thereof, the inequality signs are reversed in a relationship among recovery times thereof. Power saving state transition conditions of the above-described H-Host-IF 206, power saving state transition conditions of the above-described B-Host1-IF 207 and the above-described B-Host2-IF 208, and power saving state transition conditions of the main bodies of the HDD/SSDs 113 and 114 in the individual power saving sates of the SATA component are defined as 411 to 413, 415 to 417, and 419 to 421, respectively. Regarding a setting value in each of the conditions 411 to 421, the content divided by "/" in FIG. 4 indicates that any one of them is set in the memory. However, the number of setting values (i.e., the number of possible states) may be any number. Further, portions corresponding to an H-Host-IF state 410, a B-Host-IF state 414, and an HDD/SSD main body state 418 as power saving setting values in FIG. 4 are indicated in FIG. 2. These states correspond to the H-Host-IF 206 (including 202 and 203), the B-Host1/2-IFs 207 and 208 (including 204 and 205), and the HDD/SSDs 113 and 114, respectively. This correspondence means that these components are placed into states indicated by the setting values in the above-described conditions 411 to 421 when the state transitions to the above-described states PS0 (407) to PS2 (409). Now, the power saving states that can be handled as the power saving state transition conditions will be described. AI and LPI mean Active-Idle and Low-Power-Idle, respectively, and indicate power states defined in the ATA standard with respect to the SATA-IF and the main body of the connected device in an idle state. As described already, the above-described states Partial, Slumber, and DevSleep are the states defined in the SATA standard in the following manner, with Partial and Slumber defined as the power saving states of the SATA-IF and DevSleep defined as the power saving state of both the SATA-IF and the main body of the device.

1. PHY Ready (PHYRDY) is a state in which PHY (the physical layer) defined in the SATA standard is ready to transmit and receive data.

2. Partial-PHY (for example, the physical layer of the B-Host1-IF 207 or the B-Host2-IF 208) is prepared as the power saving state (a reduced power mode). An allowable recovery time is 10 microseconds at most.

3. Slumber-PHY is a power saving state in which power is lower than in the Partial mode. The recovery time is 10 milliseconds at most. A wake-up signal sequence is transmitted from the host (for example, the SATA host control unit 111) or the device (for example, the HDD/SSD 113 or 114). When this sequence is transmitted, SATA PHY is brought into an activated state or set into the PHYRDY mode.

The above-described recovery time is a maximum time taken since the device in compliance with SATA receives a wake-up signal until recovering into the PHYRDY mode.

4. DevSleep will be described in the following manner. A signal line for Dev Sleep is prepared between the host and device. When a signal relating to Dev Sleep is transmitted from the host to the device, PHY between the host and the device, and other circuits may be powered off. When a signal for clearing Dev Sleep (COMWAKE or COMRESET/COMINIT) is transmitted from the host to the device, a renegotiation is started between the host and the device. An example of an application of COMWAKE will be described in detail in, for example, a description of S904 illustrated in FIG. 9.

Further, OffLine indicates a disabled (stopped) state as the SATA-IP. When the power saving states are lined up in descending order of how effective these states are as the power saving of the SATA-IF, a result thereof is generally OffLine>DevSleep>Slumber>Partial>LPI>AI. Similarly, the effectiveness as the power saving of the main body of the device is the power-off>DevSleep>LPI>AI. As will be descried below with reference to the drawings, the above-described power saving state transition conditions will be set in advance when the above-described SATA host control unit 111 and SATA bridge control unit 112 are activated. Further, generally, the respective power saving effects of the HCPU system of the above-described SATA host control unit 111 and the BCPU system of the SATA bridge control unit 112 themselves are traded off for the recovery time. It is desirable that the power saving settings of the HCPU system of the SATA host control unit 111 and the BCPU system of the SATA bridge control unit 112 themselves are set so as to satisfy the above-described relationship PS0<PS1<PS2 (the power-off), but may be in a relationship PS0≤PS1<PS2. Examples of a method for saving the power of the above-described HCPU 301 and BCPU 310 themselves include a method such as partially stopping power supply with use of a clock gate or disconnection of a power source although this is not illustrated in the present example.

Now, in the example illustrated in FIG. 4, the number of power states of the entire printing apparatus 1000 is three stages, and the power states of the SATA component that correspond to them are three stages. However, the above-described numbers of power states and power saving states of the SATA component may be any numbers. Further, the power saving state transition conditions 415 to 417 of the above-described B-Host1/2-IFs 207 and 208, and the power saving state transition conditions 419 to 421 of the main bodies of the HDD/SSDs 113 and 114 may be set individually for each connection port.

FIG. 5 illustrates examples of extended commands relating to the power saving control. FIG. 5 illustrates extended commands for, for example, setting each of the power saving state transition conditions described with reference to FIG. 4 to the SATA bridge control unit 112 in advance. There is prepared a vender unique command (for example, F0h), which is an empty command defined in the SATA standard. A power saving-related extended command is uniquely defined into this command as an extended command name 501, a command (CMD) (a sub command) number 502, and a transfer type 503 as indicated from the left side in the first row in FIG. 5. In the present example, the CMD number 502 indicates a sub command number set in a Feature resister with respect to the vender unique command (for example, F0h). Further, transfer types such as a Non-Data (ND) transfer, which does not transmit data, a programmed input/output (PIO)-IN (PI) or PIO-OUT (PO) transfer, which transfers a single piece of data, and a direct memory access (DMA) transfer, which transfers data successively, are defined in the SATA standard as basic transfer types. The transfer type 503 illustrated in FIG. 5 defines a transfer type with respect to the CMD number 502. For example, a SetupPowerConfig command 505 includes the CMD number: 01h (506) and the transfer type: PO (507). Similarly, FIG. 5 indicates that a ToSleep command 509 is defined with the CMD number: 02h (510) and the transfer type: ND (511), a ToDeep command 513 is defined with the CMD number: 03h (514) and the transfer type: ND (515), and a GetStatus command 517 is defined with the CMD number: 04h (518) and the transfer type: PI (519). The SetupPowerConfig command 505 is used to set the power saving state transition conditions 411 to 413 of the above-described H-Host-IF 206, the power saving state transition conditions 415 to 417 of the above-described B-Host1/2-IFs 207 and 208, and the power saving state transition conditions 419 to 421 of the main bodies of the HDD/SSDs 113 and 114, to the above-described SATA bridge control unit 112 (508). The ToSleep command 509 is a command for notifying the SATA bridge control unit 112 that the upper-level power state 401 transitions to the Sleep mode 403 (512). Similarly, the ToDeep command 513 is a command for notifying the SATA bridge control unit 112 that the upper-level power state 401 transitions to the Deep mode 404 (516). The GetStatus command 517 is an extended command for acquiring the status of the entire SATA bridge control unit 112. This is not an extended command directly relating to the power saving, but is used when, for example, the upper-level system acquires information indicating completion of processing for transitioning to the power saving. Hereinafter, a command defined in the ATA standard other than the extended commands will be referred to as an ATA command when being expressed while being distinguished from the extended commands.

Further, a control method according to the present exemplary embodiment will be described with reference to several flowcharts. Error processing unrelated to the present exemplary embodiment will be omitted from the following description to avoid complication of the description.

FIG. 6 illustrates a flow of configuring initial settings for the power saving control of the SATA component. When the main controller 120 is activated (cold boot), in step S601, the main CPU 101 sets the power saving state transition conditions 411 to 413 of the H-Host-IF 206 corresponding to PS0 to PS2, which have been described with reference to FIG. 4, to the above-described SATA host control unit 111.

In step S602, the main CPU 101 sets the power saving state transition conditions 415 to 417 of the above-described B-Host1/2-IFs 207 and 208 and the transition setting conditions 419 to 421 of the main bodies of the HDD/SSDs 113 and 114, which have been described with reference to FIG. 4, to the above-described SATA bridge control unit 112 by causing the above-described SetupPowerConfig command 505 to be issued from the SATA host control unit 111. Upon receiving the above-described SetupPowerConfig command 505, the BCPU 310 records the power saving state transition conditions into a predetermined location. Now, as the location where the power saving state transition conditions are recorded in the above-described SATA host control unit 111 and SATA bridge control unit 112, the settings are recorded in, for example, the above-described register H 306, register B 314, SRAM 304 or 313, or flash memory 303 or 312. This location is not especially limited as long as this location allows the settings therein to be read out at the time of the processing for transitioning to the power saving. Further, the initial settings when the main controller 120 is activated has been described in the above description, but the power saving state transition conditions may be set again at an arbitrary timing by the same setting method as long as the printing apparatus 1000 is in the above-described Standby mode 402. Assume that, when the printing apparatus 1000 according to the present exemplary embodiment is started up (cold boot), first, the upper-level power state 401 transitions to the Standby mode 402 and the SATA control system and the storage devices connected thereto transition to the idle state.

When the power state of the printing apparatus 1000, which is the upper-level system, such as the entire MFP, transitions to the state of the Sleep mode 403, the main CPU 101 generates an interrupt signal of PS1. The interrupt signal is transmitted to the HCPU 301, and, along therewith, the Sleep command is transmitted to the BCPU 310 and is written into the register in the BCPU 310.

When the power state of the printing apparatus 1000, which is the upper-level system, such as the entire MFP, transitions to the state of the DeepSleep (Deep) mode 404, the main CPU 101 generates an interrupt signal of PS2. The interrupt signal is transmitted to the HCPU 301, and, along therewith, the DeepSleep command is transmitted to the BCPU 310 and is written into the register in the BCPU 310.

In response to the transition of the power state of the printing apparatus 1000, which is the entire upper-level apparatus, such as the MFP, to the Standby mode 402, an interrupt of PS0 is generated on the main CPU 101 and is transmitted to the HCPU 301. The present system is configured in such a manner that the BCPU 310 recognizes that the MFP is in the Standby mode 402 at this time as a tacit condition.

Figure 7:
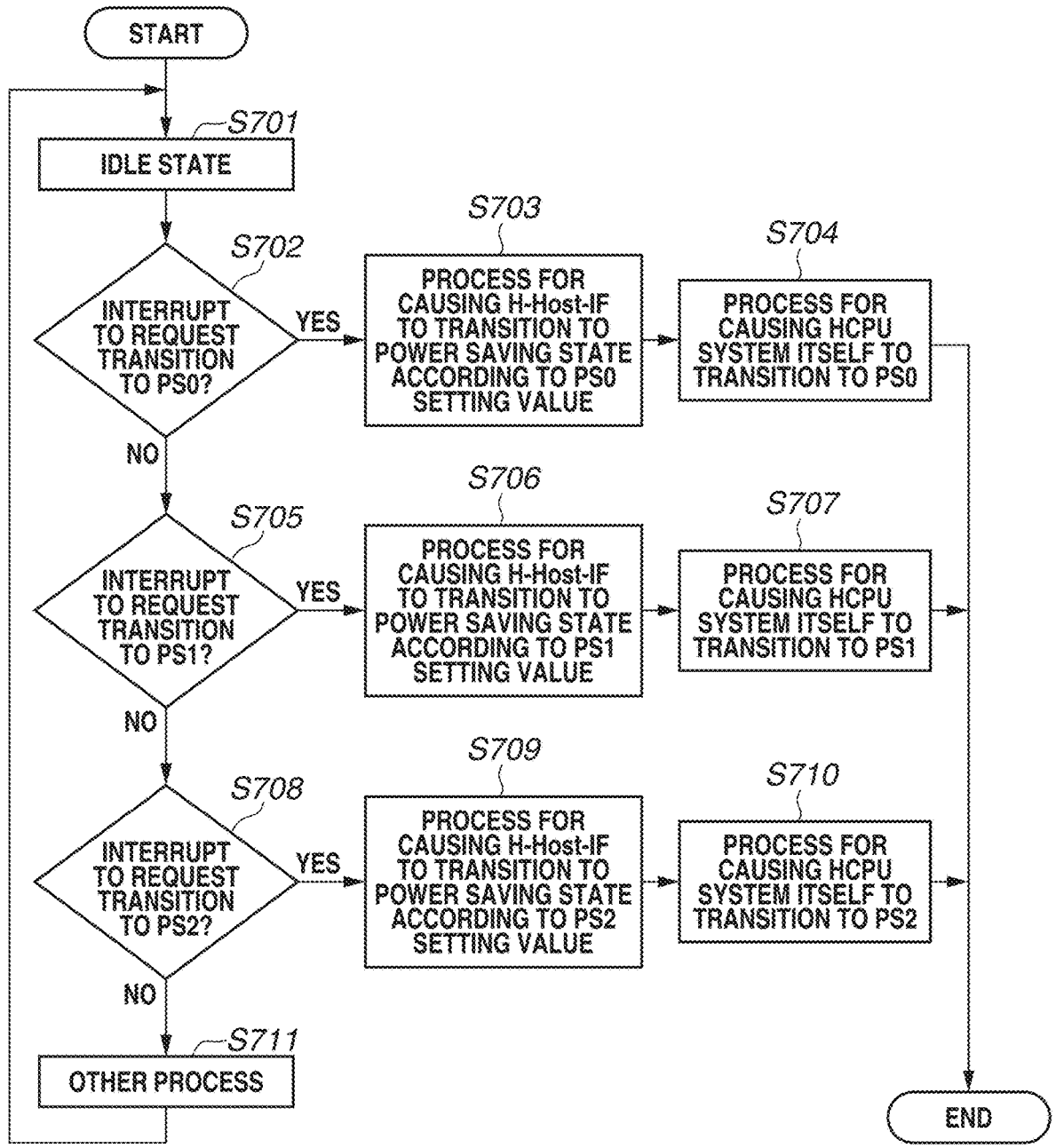
FIG. 7 illustrates an example of a flow of processing in which the SATA host control unit transitions to the power saving state.

FIG. 7 illustrates a sequence in which the above-described SATA host control unit 111 transitions to the power saving state.

In step S701, the HCPU 301 waits for an interrupt instruction from the above-described main CPU 101 as the idle (waiting) state. In step S702, the HCPU 301 determines the interrupt signal received from the main CPU 101.

If a result of the determination in step S702 is an interrupt to request the transition to PS0 (YES in step S702), the processing proceeds to step S703. In step S703, the HCPU 301 performs a process for causing the preset above-described H-Host-IF 206 to transition to the power saving state as the above-described state PS0 (407). In step S704, the HCPU 301 causes the entire HCPU system to transition to the power saving state as PS0 (407), thereby completing the transition processing. If the result of the determination in step S702 is not the interrupt to request the transition to PS0 (NO in step S702), the processing proceeds to step S705. If a result of a determination yielded by the HCPU 301 is an interrupt to request the transition to PS1 in step S705 (YES in step S705), the processing proceeds to step S706. In step S706, the HCPU 301 performs a process for causing the present above-described H-Host-IF 206 to transition to the power saving state as the above-described state PS1 (408). In step S707, the HCPU 301 causes the entire HCPU system to transition to the power saving state as PS1 (408), thereby completing the transition processing. If the result of the determination in step S705 is NO (NO in step S705), the processing proceeds to step S708. If a result of a determination yielded by the HCPU 301 is an interrupt to request the transition to PS2 in step S708 (YES in step S708), the processing proceeds to step S709. In step S709, the HCPU 301 performs a process for causing the preset above-described H-Host-IF 206 to transition to the power saving state as the above-described state PS2 (409). In step S710, the HCPU 301 causes the entire HCPU system to transition to the power saving state as PS2 (409), thereby completing the transition processing. If the result of the determination in step S708 is NO (NO in step S708), the processing proceeds to step S711. In step S711, the HCPU 301 performs a process according to an interrupt other than the request to transition to the power saving state, such as a process for issuing a write command at the time of a normal data transfer. After the process is completed, the processing returns to step S701 again, and the HCPU 301 enters the idle state. After the transition to the requested power saving state, the HCPU 301 notifies the main CPU 101 of a transition completion interrupt, and at the same time, reports a part of the above-described register H 306 as a status register of the power saving state, although this is not illustrated in FIG. 7.

Now, several examples of the set power saving state transition conditions of the H-Host-IF 206 in the above-described states PS0 (407) to PS2 (409) will be described. Regarding the above-described Partial and Slumber states, the SATA-IF transmits a request packet defined in the SATA standard, and can enter the power saving state for the SATA-IF if a transmission destination permits it. Further, regarding the above-described state DevSleep, the power of the main body of the connected device can be reduced by first placing the SATA-IF into Slumber and further setting a DEVSLP signal, which is a single-ended signal, into an enabled state.

This will be described with reference to FIG. 2. When the SATA component is instructed to transition to DEVSLEEP, the power of 202 to 205 is stopped except for a function of detecting the DEVSLP signal. Further, the physical layer on the SSD/HDD side is also powered off except for a function of detecting the DEVSLP signal. As will be described below, the upper-level system clears the DEVSLEEP signal directed to the SATA control unit 1100 (via the B-Host1-IF 207 and the B-Host2-IF 208). Then, the SATA host control unit 111 recovers, and the SATA bridge control unit 112 also recovers subsequently. Further, the SATA bridge control unit 112 causes the HDD/SSDs 113 and 114 to recover.

Figure 8:
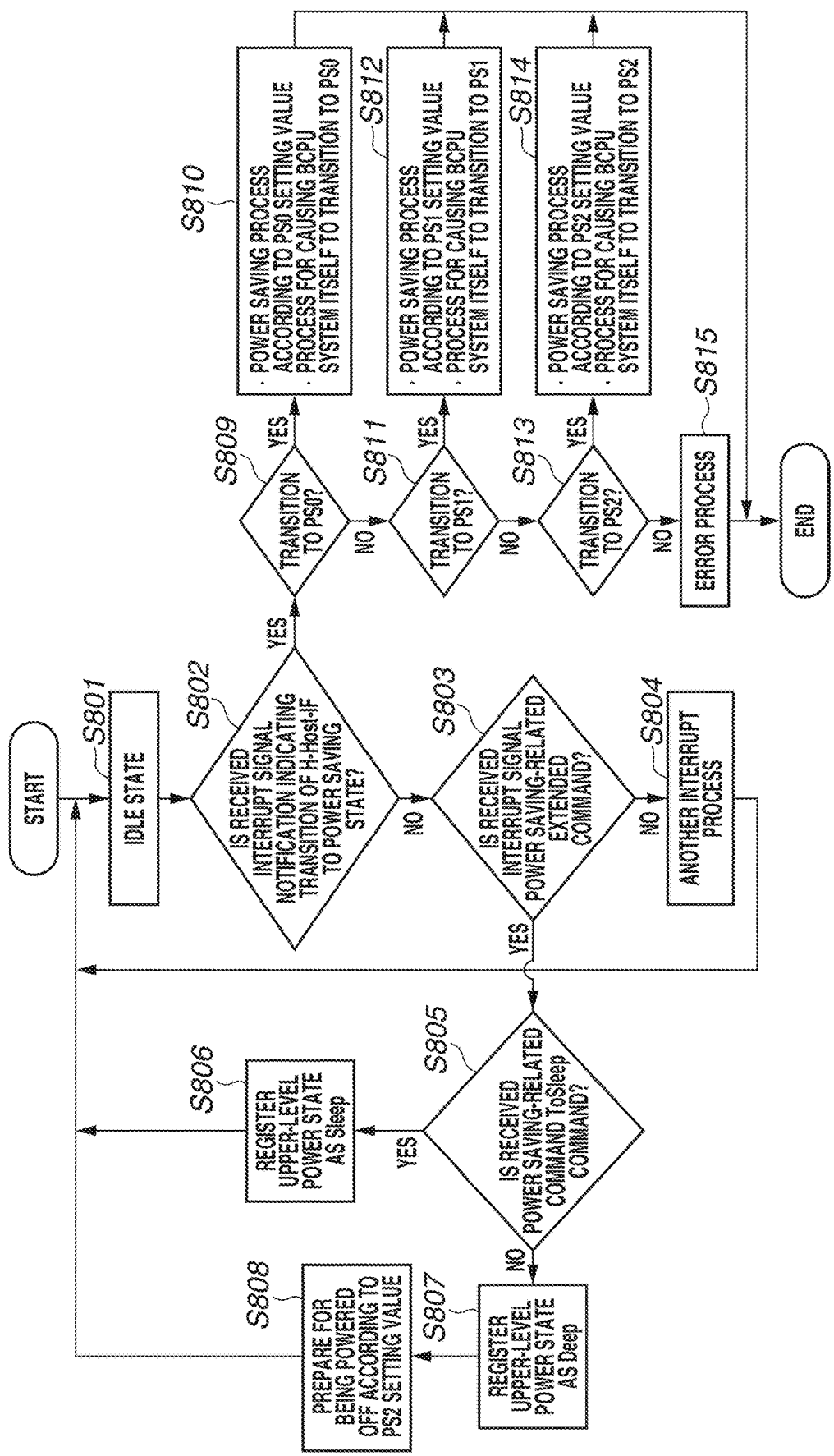
FIG. 8 illustrates an example of a flow of processing in which the SATA bridge control unit transitions to the power saving state.

FIG. 8 illustrates a sequence in which the above-described SATA bridge control unit 112 transitions to the power saving state. In step S801, the BCPU 310 is waiting as the idle state. Basically, the BCPU 310 is in a state waiting for an interrupt instruction from the HCPU 301, which is the above-described SATA host control unit 111. In step S802, the BCPU 310 determines whether the received interrupt signal is a notification indicating the transition of the above-described H-Host-IF 206 to the power saving state. If the BCPU 310 determines that the received interrupt signal is not a notification indicating the transition of the above-described H-Host-IF 206 to the power saving state in step S802 (NO in step S802), the processing proceeds to step S803. In step S803, the BCPU 310 determines whether the received interrupt signal is the power saving-related extended command. If the BCPU 310 determines that the received interrupt signal is not the power saving-related extended command in step S803 (NO in step S803), the processing proceeds to step S804. In step S804, the BCPU 310 performs another interrupt process, such as an ATA command process, and returns to the idle state in step S801 again. If the BCPU 310 determines that the received interrupt signal is the power saving-related extended command in step S803 (YES in step S803), the processing proceeds to step S805. In step S805, the BCPU 310 determines whether the power saving-related command received from the main CPU 101 is the above-described ToSleep command 509. If the BCPU 310 determines that the power saving-related command received from the main CPU 101 is the above-described ToSleep command 509 in step S805 (YES in step S805), the processing proceeds to step S806. In step S806, the BCPU 310 registers the upper-level power state 401 into, for example, the above-described register B 314 or SRAM 313 as the above-described Sleep mode 403. If the BCPU 310 determines that the power saving-related command received from the main CPU 101 is not the above-described ToSleep command 509 in step S805 (NO in step S805), the processing proceeds to step S807. In step S807, the BCPU 310 determines that the received power saving-related command is the above-described ToDeep command 513, and registers the upper-level power state 401 into, for example, the above-described register B 314 or SRAM 313 as the above-described Deep mode 404. After that, the processing proceeds to step S808. In step S808, the BCPU 310 prepares for the transition to the Deep mode. Basically, the above-described Deep mode 404 is assumed to be conducted with power-off processing performed by the above-described power control unit 209. Therefore, an IC of a type like the SATA bridge control unit 112 including the storage device (HDD or SSD) and the flash memory that especially cannot afford to be subjected to an instantaneous power interruption should prepare for being powered off, and notify the main CPU 101 of a power-off timing after completing the preparation. Whether the preparation for being powered off as the PS2 state is completed can be acquired via the above-described GetStatus command 517. The main CPU 101 notifies the above-described power control unit 209 of a power-off permission after confirming that the above-described SATA host control unit 111 and SATA bridge control unit 112 complete the preparation for being powered off by the above-described status acquisition method, although this is not illustrated in FIG. 8. Further, the preparation when the HDD is powered off includes, as one example thereof, issuing a FLUSH CACHE command and a SLEEP command according to the ATA standard to, for example, save data and a physical header.

If the received interrupt signal is the notification indicating the transition of the above-described H-Host-IF 206 to the power saving state in step S802 (YES in step S802), the processing proceeds to step S809. In step S809, the BCPU 310 determines whether the SATA bridge control unit 112 should transition to PS0 (407) based on the Standby mode 402 as the upper-level power state 401 and the power saving state transition condition 411 of the preset above-described H-Host-IF 206. If a result of the determination in step S809 is YES (YES in step S809), the processing proceeds to step S810. In step S810, the BCPU 310 performs a process for the transition to PS0 (407) based on the power saving state transition condition 415 of the preset above-described B-Host1/2-IFs 207 and 208 and the power saving state transition condition 419 of the main bodies of the HDD/SSDs 113 and 114, and causes the BCPU system itself to transition to the power saving state as PS0 (407) lastly, thereby completing the transition processing. If the result of the determination in step S809 is NO (NO in step S809), the processing proceeds to step S811. In step S811, the BCPU 310 determines whether the SATA bridge control unit 112 should transition to PS1 (408) based on the Sleep mode 403 as the upper-level power state 401 and the power saving state transition condition 412 of the preset above-described H-Host-IF 206. If a result of the determination in step S811 is YES (YES in step S811), the processing proceeds to step S812. In step S812, the BCPU 310 performs a process for the transition to PS1 (408) based on the power saving state transition condition 416 of the preset above-described B-Host1/2-IFs 207 and 208 and the power saving state transition condition 420 of the main bodies of the HDD/SSDs 113 and 114, and causes the BCPU system itself to transition to the power saving state as PS1 (408) lastly, thereby completing the transition processing. If the result of the determination in step S811 is NO (NO in step S811), the processing proceeds to step S813.

In step S813, the BCPU 310 determines whether the SATA bridge control unit 112 should transition to PS2 (409) based on the Deep mode 404 as the upper-level power state 401 and the power saving state transition condition 413 of the preset above-described H-Host-IF 206. If a result of the determination in step S813 is YES (YES in step S813), the processing proceeds to step S814. In step S814, the BCPU 310 performs a process for the transition to PS2 (409) based on the power saving state transition condition 417 of the preset above-described B-Host1/2-IFs 207 and 208 and the power saving state transition condition 421 of the main bodies of the HDD/SSDs 113 and 114. Then, the BCPU 310 causes the BCPU system itself to transition to the power saving state as PS2 (409) lastly, thereby completing the transition processing. If the result of the determination in step S813 is NO (NO in step S813), the processing proceeds to step S815. In step S815, the BCPU 310 performs an error process as a failure in the transition to the power saving state. Basically, the BCPU 310, for example, notifies the upper level of the status, but a description thereof will be omitted here. To summarize the processing described so far, the transition of the SATA bridge control unit 112 to any of the above-described power saving states PS0 (407) to PS2 (409) is determined in the following manner. That is, which state the SATA bridge control unit 112 should transition to, among PS0 (407) to PS2 (409), is determined based on two conditions, information of the above-described upper-level power state 401 (the Standby mode 402, the Sleep mode 403, or the Deep mode 404) and the power saving state of the above-described H-Host-IF 206 as described with reference to FIG. 8.

Now, in a case where the power saving state transition conditions 419 to 421 of the main bodies of the HDD/SSDs 113 and 114 are the power-off instruction especially in the above-described state PS0 (407) or PS1 (408), the BCPU 310 requests the power control unit 209 to power off the HDD/SSDs 113 and 114 as described with reference to the above-described drawings, FIGS. 12 and 13.

Figure 9:
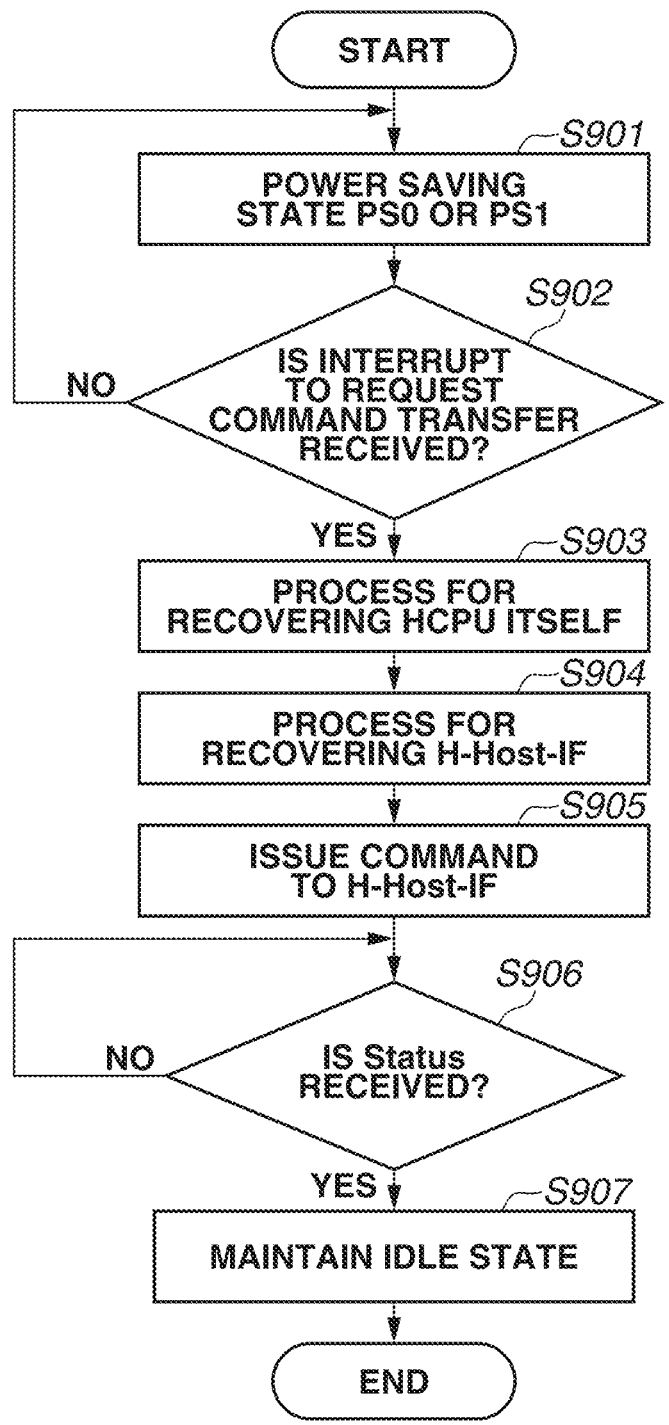
FIG. 9 illustrates an example of a flow of processing in which the SATA host control unit recovers from the power saving state.

FIG. 9 illustrates a flow in which the above-described SATA host control unit 111 recovers. FIG. 9 illustrates a sequence in which the SATA host control unit 111 recovers from the above-described state PS0 (407) or PS1 (408). In step S901, the HCPU 301 is in the power saving state PS0 or PS1. In step S902, the HCPU 301 is in a state waiting for an interrupt request from the main CPU 101. If no interrupt request is received (i.e., if the HCPU 301 determines NO in step S902 (NO in step S902)), the processing returns to step S901, in which the HCPU 301 maintains the power saving state PS0 or PS1. If the HCPU 301 receives an interrupt to request a command transfer in step S902 (YES in step S902), the processing proceeds to step S903. In step S903, the HCPU 301 performs a process for recovering itself. Then, in the next step, step S904, the HCPU 301 performs a process for recovering the above-described H-Host-IF 206. More specifically, the HCPU 301 performs processing for establishing a link until the H-Host-IF 206 becomes ready to issue a command through a predetermined sequence such as Out of Band (OOB) and a speed negotiation defined in the SATA standard. Now, basically, the recovery from the power saving state of the SATA-IF component is started with issue of the ComReset signal, which is a reset signal defined in the SATA standard. The recovery from the above-described DevSleep state is carried out in a reverse order of the procedure for the transition described with reference to FIG. 7, i.e., started by first disenabling the DEVSLP signal and then next inputting the ComReset signal (or the ComWake signal). In step S905, the HCPU 301 issues a request command from the main CPU 101 to the H-Host-IF 206 upon confirming that the link is established. Then, the processing proceeds to step S906. In step S906, the HCPU 301 starts waiting for reception of Status from the above-described SATA-IP (Device) 203. The HCPU 301 waits continuously therefrom while Status is not received (NO in step S906), and ends a series of command processes when Status is received (YES in step S906). After that, in step S907, the SATA host control unit 111 maintains the idle state until a request to transition to the power saving state is issued from the main CPU 101 again.

Figure 10:
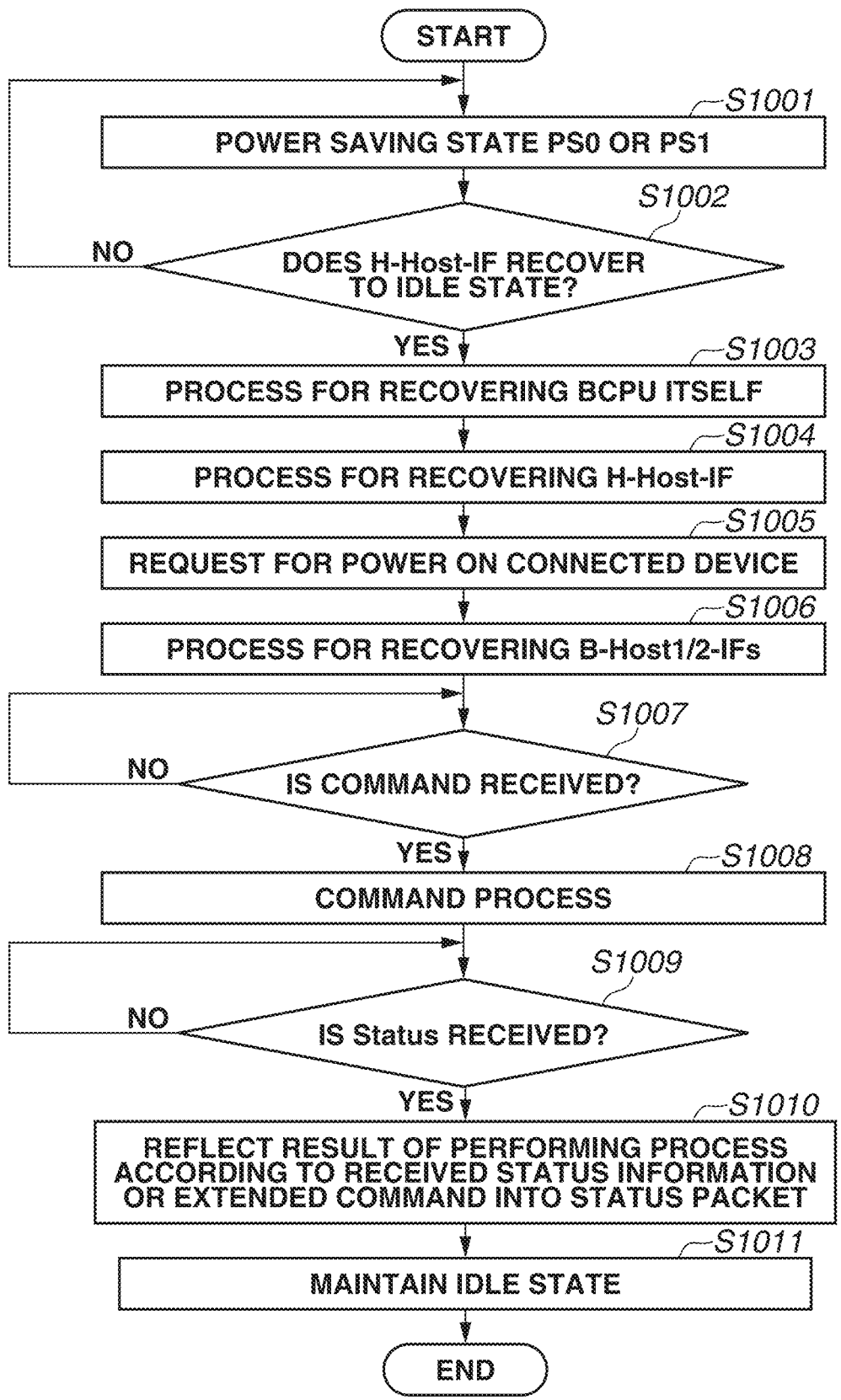
FIG. 10 illustrates an example of a flow of processing in which the SATA bridge control unit recovers from the power saving state.

FIG. 10 illustrates a flow of processing in which the SATA bridge control unit 112 recovers from the power saving state. FIG. 10 illustrates a sequence in which the above-described SATA bridge control unit 112 recovers from the above-described state PS0 (407) or PS1 (408). In step S1001, the BCPU 310 is in the power saving state PS0 or PS1. In step S1002, the BCPU 310 is in a state waiting for an interrupt request. If no interrupt request is received (i.e., if the BCPU 310 determines NO in step S1002 (NO in step S1002)), the processing returns to step S1001, in which the BCPU 310 maintains the power saving state PS0 or PS1. If the BCPU 310 receives an interrupt to start the processing for recovering the above-described H-Host-IF 206 to the idle state in step S1002 (YES in step S1002), the processing proceeds to step S1003. Now, at the start of the above-described recovery processing, the interrupt signal is issued due to detection of a level change in which the DEVSLP signal described with reference to FIG. 9 is disenabled, and ComReset (or ComWake). In step S1003, the BCPU 310 performs a process for recovering itself. Then, in the next step, step S1004, the BCPU 310 performs a process for recovering the above-described H-Host-IF 206. More specifically, the BCPU 310 performs a process for establishing the link until the H-Host-IF 206 becomes ready to issue a command through the predetermined sequence such as Out of Band (OOB) and the speed negotiation defined in the SATA standard.

In step S1005, the BCPU 310 requests the power control unit 209 to power on the HDD/SSDs 113 and 114 as described with reference to the above-described drawings, FIGS. 12 and 13 if the HDD/SSDs 113 and 114, which are the connected devices, have been powered off. The processing proceeds to step S1006 directly if the HDD/SSDs 113 and 114 have been in the powered-on state at the time of the recovery. In step S1006, the BCPU 310 performs a process for recovering the above-described B-Host1/2-IFs 207 and 208. The recovery processing is similar to the processing for recovering the above-described H-Host-IF 206 described with reference to FIG. 9, and therefore a description thereof will be omitted here. If the B-Host1/2-IFs 207 and 208 have been set to be placed in the idle state according to the previous transition condition (i.e., in a state capable of issuing a command immediately), no processing is especially performed, and the processing proceeds to the next step, step S1007. In step S1007, the BCPU 310 starts waiting to receive a command upon confirming that the link is established. This means that the recovery from the power saving state to the idle state is completed at this time. The BCPU 310 remains in step S1007 while no command is received (NO in step S1007). Then, if a command is received (YES in step S1007), the processing proceeds to step S1008. In step S1008, the BCPU 310 performs a command process. Now, if the received command is the ATA command, the BCPU 310 issues a command to one or both of the above-described B-Host1/2-IFs 207 and 208 as necessary. Then, the processing proceeds to step S1009. In step S1009, the BCPU 310 starts waiting to receive Status from the above-described HDD/SSDs 113 and 114. The BCPU 310 waits continuously therefrom while Status is not received (NO in step S1009). The processing proceeds to step S1010 when Status is received (YES in step S1009). If the received command is the above-described extended command, the processing proceeds to step S1010 after predetermined processing is completed within the SATA bridge control unit 112. In step S1010, the BCPU 310 reflects a result of performing a process according to the status information or the extended command received from the above-described HDD/SSDs 113 and 114 into a status packet defined in the SATA standard. Then, the BCPU 310 transmits the packet to the SATA-IP (Host) 202, thereby ending a series of command processes. After that, in step S1011, the SATA bridge control unit 112 maintains the idle state until a request to transition to the power saving state is issued from the main CPU 101 again. If the ATA command is received during a time period from steps S1005 to S1006, this case leads to the BCPU 310 forced to wait until step S1006 in which the link with the connected device on the bridge side is established, although this is not illustrated in FIG. 10. Further, the recovery from the above-described state PS2 (409) is similar to the activation from the power-off, i.e., the operation at the time of the cold boot from the viewpoint of the SATA control system, and therefore a description thereof will be omitted here.

Figure 11:
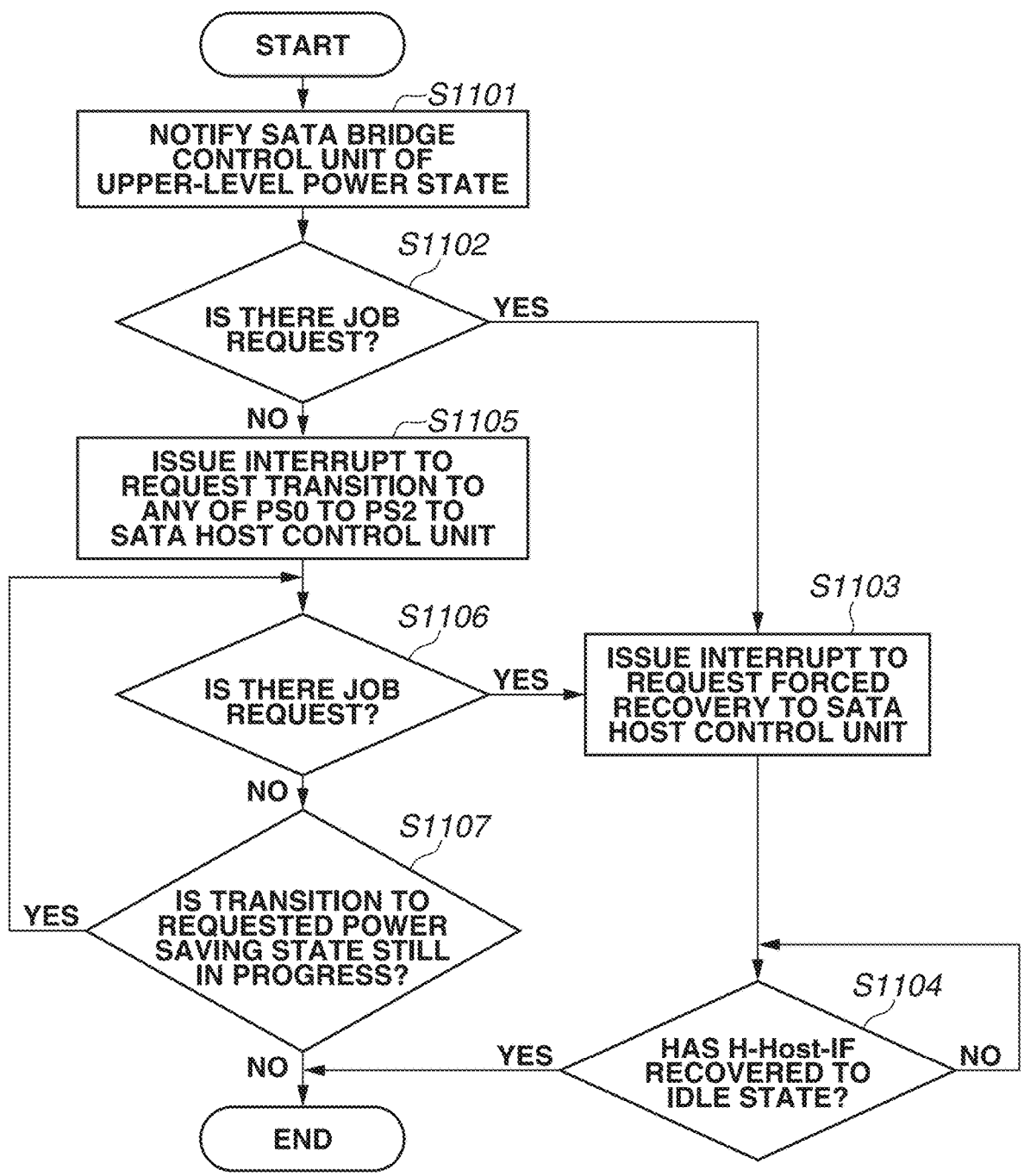
FIG. 11 illustrates an example of a flow of forced recovery processing during preparation for transition to any of the power saving states PS0 to PS2.

FIG. 11 illustrates a flow of forced recovery processing during the preparation for transition to the above-described power saving states PS0 (407) to PS2 (409). The forced recovery processing in the middle of transition to the power saving state is started when a job requiring the HDD occurs in the MFP. Alternatively, the processing illustrated in FIG. 11 is started when the printing apparatus 1000 (not limited to the SATA component) falls into an error state, and reset processing is forcibly initiated by a driver. In step S1101, the main CPU 101 notifies the above-described SATA bridge control unit 112 of the upper-level power state 401 to place the SATA component into the power saving state. More specifically, this notification means issue of the above-described ToSleep command 509 or ToDeep command 513. Then, if a job request occurs on the main CPU 101 during the processing for transitioning to the power saving state after that (YES in step S1102), the processing proceeds to step S1103. In step S1103, the main CPU 101 issues an interrupt to request the forced recovery in the middle of the transition to the power saving state to the above-described SATA host control unit 111. Upon receiving this interrupt, the HCPU 301 performs hard reset processing on a required module in the SATA host control unit 111, and transmits the ComReset signal to the above-described H-Host-IF 206, although this is not illustrated in FIG. 11. Upon receiving this signal, the BCPU 310 of the SATA bridge control unit 112 discards the upper-level power state information received in step S1101, and recognizes the current state as the Standby mode 402. Further, the BCPU 310 performs the processing for recovering the HDD/SSDs 113 and 114, which are the connected devices. The recovery processing has been already described with reference to FIG. 10, and therefore a description thereof will be omitted here. After the process in step S1103, the main CPU 101 causes the processing to proceed to step S1104. In step S1104, the main CPU 101 checks the status register (a part of the above-described register H 306) indicating the power saving state of the above-described SATA host control unit 111. Then, if the SATA host control unit 111 has not recovered to the idle state (NO in step S1104), the main CPU 101 waits. If confirming that the SATA host control unit 111 has recovered to the idle state (YES in step S1104), the main CPU 101 ends the forced recovery processing. If the determination in step S1102 is NO (NO in step S1102), the processing proceeds to step S1105. In step S1105, the main CPU issues an interrupt to request the transition to any of PS0 to PS2 to the above-described SATA host control unit 111. In steps S1106 and S1107, the main CPU 101 confirms that the transition to the requested power saving state is completed from the above-described status register. If no job occurs (NO in step S1106) and the transition to the power saving state is still in progress (YES in step S1107) and, the main CPU 101 causes the processing to loop between steps S1106 and S1107. If a job occurs (YES in step S1106), the processing proceeds to step S1103. The processes in steps S1103 and S1104 have been already described, and thus a description thereof will be omitted here. If the transition to the requested power saving state is completed (NO in step S1107), the processing ends, concluding that no new job occurs during the transition to the power saving state.

The present exemplary embodiment has disclosed the main controller 120 or the engine controller 118 that is a part thereof, the panel IF unit 115, and the panel device 116, which are one example of an upper-level system. Further, the present exemplary embodiment has disclosed the SATA control unit 1100 including the SATA bridge control unit 112 and the SATA host control unit 111, which is one example of a control apparatus configured to control power of a device that communicates via a communication interface in compliance with a predetermined standard, and the printing apparatus 1000 including that. Further, a set of power saving states in compliance with the predetermined standard with respect to the physical layer of the SSD/HDD in the communication interface in compliance with the SATA standard is stored in the register in the SATA control unit 1100 in correspondence with the upper-level power state 401 indicating the power state of the engine controller 118 or the main controller 120. The set of power saving states includes, for example, the states 407 to 419 corresponding to the upper-level power state 401, and the row of the Standby mode 402.

Further, the SATA host control unit 111 and the SATA bridge control unit 112 receive the signal indicating that the upper-level system transitions to the upper-level power state indicated by 401, which is one example of a predetermined power state.

Further, the SATA control unit 1100 determines the power saving state of each of the above-described device and the physical layer of the communication interface included in the above-described device by referring to the above-described register or memory according to the reception of the signal indicating that the upper-level system transitions to this predetermined power state.

Further, one example of the upper-level system is the printing apparatus 1000. Further, the SATA control unit 1100 determines the power saving state of each of the above-described device and the physical layer of the communication interface included in the device in such a manner that the HDD/SSD 113 and the physical interface in compliance with the SATA standard that is included in the HDD/SSD 113 transition to the predetermined power saving state illustrated in FIG. 4 when the main controller 120, which is one example of a printer controller included in the printing apparatus 1000, is not in the power saving state.

Further, the following operation is performed when the engine controller 118 included in the printing apparatus 1000 is not in the power saving state. The SATA control unit 1100 determines the power saving state of each of the above-described device and the physical layer of the communication interface used by the device in such a manner that the HDD/SSD 113 and the physical interface thereof in compliance with the SATA standard transition to the predetermined power saving state.

The SATA control unit 1100 determines the power state so as to cause the HDD/SSD 113 and the physical layer thereof to transition to at least one status among DevSleep, Slumber, Partial, and Offline defined in the SATA standard according to the content of the received signal.

Further, the SATA control unit 1100 performs the following operation after determining the transition to the predetermined power saving state. The job using the HDD/SSD 113 or 114 is received by the LAN-IF unit 105. Then, the SATA control unit 1100 instructs the power control unit 209 to recover the power of the HDD/SSD 113 and the physical interface thereof.

The content of the setting set to the register in the SATA control unit 1100 includes at least the power-off and the offline of the SATA port as the power modes of the SATA interface. The condition for the transition to the power saving state that includes at least one of the power modes of the SATA interface defined in the SATA standard can be handled as the content of the setting settable regarding the physical layer of the SATA interface included in the SSD/HDD and the main body of the above-described device.

The printing apparatus 1000 includes the SATA control unit 1100 including the SATA host control unit 111 and the SATA bridge control unit 112 configured to control the SATA interface. The SATA host control unit 111 receives the signal indicating the power state of the printing apparatus 1000, and the SATA host control unit 111 controls the power saving processing according to this signal.

Further, after the SATA bridge control unit 112 is notified of the upper-level power state 401, the following procedure is performed. Specifically, the SATA bridge control unit 112 detects that the state of the SATA interface 206, which connects the SATA host control unit 111 and the SATA bridge control unit 112 to each other, transitions to the power saving state. Then, the SATA control unit 1100 determines one of the plurality of power saving levels according to the two events, i.e., the reception of the signal indicating the power state of the upper-level system and the detected transition of the state to the power saving state.

As described above with reference to the series of drawings, the employment of the present exemplary embodiment allows the preset conditions for the transition to the power saving state to be set individually for each of the above-described levels PS0 (407) to PS2 (409), and they are linked to the upper-level power state 401. Accordingly, whether to prioritize the power saving or prioritize the convenience can be freely set according to each of the levels. The above-described setting values may be fixed at the time of the initialization or may be changeable at an arbitrary timing. For example, if "prioritize the convenience" is selected on a UI screen of the above-described panel device 116, the conditions may be set to PS0: the HDD to the powered-on state and PS1: the HDD to the powered-off state. Further, if "prioritize the power saving" is selected, the conditions may be set to PS0: the HDD to the powered-off state and PS1: the HDD to the powered-off state. It is also possible to set a condition of an intermediate level of state between states of "prioritize the convenience" and "prioritize the power saving". In this way, the power reduction of the SATA control system can be realized in a manner that satisfies a desire of the user.

According to the present exemplary embodiment, due to the provision of the framework of the power saving control method in consideration of the power state of the upper-level system, it is possible to provide a mechanism that allows realization of further finely adjusted power saving control.

For example, it is desirable to power off the HDD when the HDD is unnecessary and power on the HDD only when the HDD is truly necessary in view of power and a lifetime. Further, it is sometimes necessary to make an appropriate determination about whether to continue or interrupt current background processing in response to a request to transition to the power saving state during the background processing accompanying the above-described RAID control. Even in such a case, according to the present exemplary embodiment, it is possible to easily and appropriately determine a timing at which the HDD is powered off/on and whether to continue the background processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-144508, filed Jul. 22, 2016, and No. 2017-120748, filed Jun. 20, 2017, which are hereby incorporated by reference herein in their entirety.

What is claimed is:

1. A control apparatus comprising:
   a first communication interface which complies with a predetermined standard, the control apparatus using the first communication interface to communicate with a host system;
   a plurality of second communication interfaces which comply with the predetermined standard, the control apparatus using the plurality of second communication interfaces to communicate with a plurality of devices;
   a memory configured to store first information related to power states of the plurality of devices, the first information corresponding to second information related to a power state of the host system, and to store third information related to a power state of the first communication interface, the third information corresponding to the second information related to the power state of the host system; and
   one or more control processors configured to control at least the power states of the plurality of devices and a power state of a first logic unit connected to the first communication interface,
   wherein the first logic unit is configured to receive a signal indicating that the host system shifts to a predetermined power state,
   wherein the one or more control processors are configured to control the power states of the plurality of devices in accordance with the first information stored in the memory and to control the first logic unit to shift to a power saving state in accordance with the second information stored in the memory, based on the first logic unit having received the signal,
   wherein the memory is further configured to store information related to power states of the plurality of second communication interfaces, the information corresponding to the second information related to the power state of the host system, and
   wherein the one or more control processors are configured to control power states of a plurality of logic units connected to the plurality of second communication interfaces, respectively, based on the first logic unit having received the signal.

2. The control apparatus according to claim 1,
   wherein the host system is configured to control a printing unit via one or more printer processors, and
   wherein, in a case where the one or more printer processors are not in a power saving state and an operation on the printing unit has not been executed for a predetermined period, the one or more control processors are configured to control the first logic unit to shift to the power saving state in accordance with the second information stored in the memory and to control the power states of the plurality of devices in accordance with the first information stored in the memory.

3. The control apparatus according to claim 1,
   wherein, based on according to a content of the signal received by the first logic unit, the one or more control processors are configured to control the first logic unit to shift to at least one of the following power states: DevSleep, Slumber, Partial, and Offline defined in the SATA standard.

4. The control apparatus according to claim 1,
   wherein in a case where the host system receives a job for winch the plurality of devices is to be used, after one or more control processors controls the first logic unit to shift to the power saving state and controls the plurality of devices to shift to the power saving state, one or more control processors controls the plurality of devices and the first logic unit to return from the power saving state.

5. The control apparatus according to claim 1,
   wherein the one or more control processors are configured to control the plurality of devices to shift to any one of the following power states:
   a power-off, an offline of a SATA port, and a power mode of a SATA interface defined in the SATA standard.

6. A method for controlling a control apparatus configured to communicate with a host system via a first communication interface complying with a predetermined standard and communicate with a plurality of devices via a plurality of second communication interfaces which comply with the predetermined standard, the method comprising:
   storing first information related to power states of the plurality of devices, the first information corresponding to second information related to a power state of the host system;
   storing third information related to a power state of the first communication interface, the third information corresponding to the second information related to the power state of the host system; and
   controlling at least the power states of the plurality of devices and a power state of a first logic unit connected to the first communication interface,
   wherein the first logic unit is configured to receive a signal indicating that the host system shifts to a predetermined power state,
   wherein the control apparatus is configured to control the power states of the plurality of devices in accordance with the first information stored in a memory and to control the first logic unit to shift to a power saving state in accordance with the second information stored in the memory, based on the first logic unit having received the signal,
   wherein the memory is further configured to store information related to power states of the plurality of second communication interfaces, the information corresponding to the second information related to the power state of the host system, and
   wherein the control apparatus is configured to control power states of a plurality of logic units connected to the plurality of second communication interfaces, respectively, based on the first logic unit having received the signal.

7. The control apparatus according to claim 1,
wherein the one or more control processors are configured to control the plurality of logic units to shift to any one of the following power states: a power-off, an offline of an SATA port, and a power mode of an SATA interface defined in the SATA standard.

8. The control apparatus according to claim 1,
wherein one or more control processors are configured to control the plurality of devices to shift either the power saving state or a power-off state.

* * * * *